US012698893B2

(12) United States Patent
Tian et al.

(10) Patent No.: US 12,698,893 B2
(45) Date of Patent: Aug. 4, 2026

(54) ELECTRONIC ASSEMBLY

(71) Applicant: SIGNIFY HOLDING B.V., Eindhoven (NL)

(72) Inventors: Feng Tian, Shanghai (CN); Feng Pan, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/701,348

(22) PCT Filed: Oct. 18, 2022

(86) PCT No.: PCT/EP2022/078945
§ 371 (c)(1),
(2) Date: Apr. 15, 2024

(87) PCT Pub. No.: WO2023/066919
PCT Pub. Date: Apr. 27, 2023

(65) Prior Publication Data

US 2024/0418356 A1 Dec. 19, 2024

(30) Foreign Application Priority Data

Oct. 20, 2021 (WO) ................ PCT/CN2021/125063
Nov. 22, 2021 (EP) .................................... 21209453

(51) Int. Cl.

| | |
|---|---|
| ***F21V 17/02*** | (2006.01) |
| ***F21S 8/08*** | (2006.01) |
| ***F21V 23/00*** | (2015.01) |
| ***F21V 29/508*** | (2015.01) |
| ***F21V 29/70*** | (2015.01) |

(52) U.S. Cl.
CPC ............ *F21V 29/508* (2015.01); *F21V 17/02* (2013.01); *F21V 29/70* (2015.01); *F21S 8/085* (2013.01); *F21V 23/008* (2013.01)

(58) Field of Classification Search
CPC ...... F21V 15/01; F21V 17/18; F21V 19/0015; F21V 17/00; F21V 23/009; F21S 8/043; F21S 8/04
See application file for complete search history.

(56) References Cited

U.S. PATENT DOCUMENTS 6,094,349 A 7/2000 Fassel et al.
8,876,322 B2 * 11/2014 Alexander .......... F21V 19/0015 362/218
2011/0013402 A1 * 1/2011 Little, Jr. ................ F21V 29/83 313/45

(Continued)

FOREIGN PATENT DOCUMENTS

CN 204201803 U 3/2015
CN 208124230 U 11/2018

(Continued)

*Primary Examiner* — William J Carter

(57) ABSTRACT

An electronic assembly comprises a housing having abase and a cover and electronic component mounted in the housing on a carrier. The carrier is pivotable about a first edge within the housing. An adjustment handle moves the carrier at a second, opposite, edge thereby to bring the electronic component into thermal contact with an internal surface of the cover after the cover is closed (or during closing of the cover), for dissipating heat from the electronic component.

12 Claims, 7 Drawing Sheets

(56) References Cited

U.S. PATENT DOCUMENTS

| | | | |
|---|---|---|---|
| 2020/0100386 | A1 | 3/2020 | Saturley et al. |
| 2021/0103108 | A1 | 4/2021 | Wall, Jr. et al. |

FOREIGN PATENT DOCUMENTS

| | | | |
|---|---|---|---|
| CN | 213955261 | U | 8/2021 |
| DE | 202014104475 | U1 | 11/2014 |
| EP | 3614040 | A3 | 5/2020 |

* cited by examiner

ELECTRONIC ASSEMBLY

CROSS-REFERENCE TO PRIOR APPLICATIONS

This application is the U.S. National Phase application under 35 U.S.C. § 371 of International Application No. PCT/EP2022/078945, filed on Oct. 18, 2022, and International Application No. PCT/CN2021/125063, filed on Oct. 20, 2021, which claims the benefit of European Patent application Ser. No. 21/209,453.6, filed on Nov. 22, 2021. These applications are hereby incorporated by reference herein.

FIELD OF THE INVENTION

This invention relates to electronic assemblies, and in particular electronic assemblies which include a component which needs to be thermally coupled to a surface to enable effective cooling.

BACKGROUND OF THE INVENTION

Many electronic devices include components which require heat to be dissipated away, which heat arises during operation of the component. This heat dissipation is needed in order to prevent thermal damage to that component or indeed to other components in the vicinity.

Many electronic components generate undesired heat. For example, power transistors generate a significant amount of heat that may need to be removed from the area where the power transistors are located.

For example, the internal drivers of many lamps generate a lot of heat when they are working, and this heat needs to be dissipated through the housing in which the driver is located.

A typical housing design for a lamp driver comprises an upper cover which closes a driver cavity. During assembly, the lamp driver is placed in the driver cavity and the cover is closed to seal the driver cavity. In some examples, an upper surface of the driver is provided with a thermally conductive pad attached to the driver via a thermally conductive paste. The cover is pressed on the thermally conductive pad to provide a thermal coupling to the driver. The cover then conducts heat away from the driver to the outside or to heat dissipation fins, to enable heat dissipation.

This structure has some disadvantages. The greater the power of the lamp, the more drivers are needed, and the larger the (combined) area of the thermal pad that is required. In this way, the cover needs to compress a large area of the thermal pad. As a result, a larger force is required to press the cover down to close it over a base of the housing and to fasten the cover in its closed position. This is an inconvenient process step during the production of the lamps. The cover is for example closed manually, and a significant amount of effort may be needed to press the down the cover to complete the assembly, This increases the cost of the man-hours used in production. It also means subsequent maintenance is more difficult, and the maintenance cost is high.

There is therefore a need for an improved assembly design which enables good thermal coupling of an internal component to its housing, while reducing difficulties in assembling the housing, in particular closing a cover of the housing against a thermal coupling part of the internal component.

U.S. Pat. No. 6,094,349A1 discloses an electrical device has a printed-circuit board secured to a cover of the electrical-device housing, as well as a heat-dissipation mat arranged on a housing wall.

DE 202014104475U1 discloses a device for transferring heat, with two solid heat-conducting bodies which are arranged vertically one above the other at a variable distance, a spring-elastic element by which the two heat-conducting bodies are pressed apart.

US 2020100386A1 discloses a module in a hardened optical platform includes one or more Printed Circuit Boards (PCB) and associated components; at least one cage configured to receive a pluggable optical module.

EP 3614040A2 discloses a light source plate structure of a ceiling light, comprising a fixed top cover and a light source plate detachably mounted to the fixed top cover.

SUMMARY OF THE INVENTION

The invention is defined by the claims.

According to examples in accordance with an aspect of the invention, there is provided an electronic assembly, comprising:

- a housing having a base and a cover, the cover being openable and closeable and having an internal surface;
- an electronic component mounted in the housing;
- a carrier on which the electronic component is mounted, the carrier comprising a first edge and an opposite second edge, wherein the first edge is pivotably mounted relative to the base of the housing;
- a thermal coupling component on top of the electronic component for making contact with the internal surface of the cover for dissipating heat from the electronic component;
- an adjustment handle on the outside of the housing; and
- an actuator being configured to be moved by the adjustment handle, wherein the actuator engages with the carrier, thereby to adjust a position of the second edge of the carrier thereby to move the thermal coupling component towards the internal surface of the cover.

This assembly has an actuator to adjust a position of the carrier (e.g. printed circuit board) of an electronic component, so that a thermal coupling to a housing cover can be ensured. In this way, the cover can be closed easily, since closing the cover does not require tight compression between the cover and the thermal coupling component. In particular, the cover is subjected to very little force during closing. Only after closing, the thermal coupling is improved by operating the adjustment handle, which tilts the carrier towards the internal surface of the cover.

A movement of the adjustment handle preferably creates a smaller amount of movement of the actuator.

The adjustment handle thus provides a mechanical advantage. The thermal coupling component may also move less than the actuator, so that a high force is applied to the thermal coupling component from a small force needed to operate the adjustment handle.

The adjustment handle for example comprises a rotary adjustment knob and the actuator comprises a cam. A rotary adjustment is simple and intuitive for a user. Of course, in other examples, a slider or other type of actuator may be used.

The adjustment handle is for example movable between:

- a first position in which the cover can be opened and closed, and
- a second position in which the cover is locked to the base.

Thus, the same handle, e.g. rotary knob, is used to lock the cover closed as well as moving the carrier to implement a good thermal coupling between the cover and the electronic component.

The second position of the adjustment handle for example makes the carrier parallel to the base and at its highest position. The thermal conduction component (e.g. pad) is compressed and is tightly pressed against the cover. Thus, a locking of the cover closed simultaneously implements compression of the thermal conduction component and pressure against the internal surface of the cover.

The adjustment handle for example comprises a first part attached to the cover and a second part attached to the base. The two parts engage when the cover is closed, and this means the adjustment handle may also lock the cover to the base, as mentioned above.

In the first position of the adjustment handle, the first and second parts for example engage with each other by closing the cover, and the second edge of the carrier is in a position furthest from the internal surface of the cover.

In the second position of the adjustment handle, the second edge of the carrier is in a position closest to the internal surface of the cover.

Thus, when the cover is closed, the carrier is away from the cover so that little force is needed to close the cover. Only after the cover is closed is the carrier moved by operating the adjustment handle to create an enhanced thermal coupling.

The first part for example comprises an outer manually operated rotary handle part attached to the cover and the second part comprises a crankshaft which is engaged by the rotary handle part when the cover is closed, wherein rotation of the rotary handle part rotates the engaged crankshaft and rotation of the crankshaft rotates the actuator.

The handle part for example comprises a pillar which engages with a channel in the crankshaft when the cover is closed. Thus, the handle part and the crankshaft engage when the cover is closed, so that rotation of the handle part turns the crankshaft to adjust the height of the carrier.

The length of the crankshaft (from the rotation axis to the pillar) is for example at least three times the length of the actuator (from the rotation axis).

The length of the actuator is for example a cam height. This mechanical advantage makes it easy to rotate the handle part and deliver a large force to compress the thermal coupling component by means of the actuator.

A center of the thermal coupling component is for example at a first distance from the first edge, and the length of the carrier between the first and second edges of the carrier is at least 1.5 times the first distance.

This provides a further mechanical advantage (i.e. increase in force) in that a larger force and smaller movement is applied to the thermal coupling component, compared to the force and movement of the actuator.

The first edge of the carrier for example comprises an arcuate shaft which can rotate with respect to a guide formed by the base of the housing. Thus, the carrier pivots about this shaft when the adjustment is implemented by the adjustment handle.

The electronic component is for example a lighting driver and the housing comprises a driver compartment.

The invention also provides a luminaire comprising:

- the assembly defined above having a lighting driver as the electronic component; and
- a light source driven by the lighting driver.

The luminaire for example is a streetlight.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
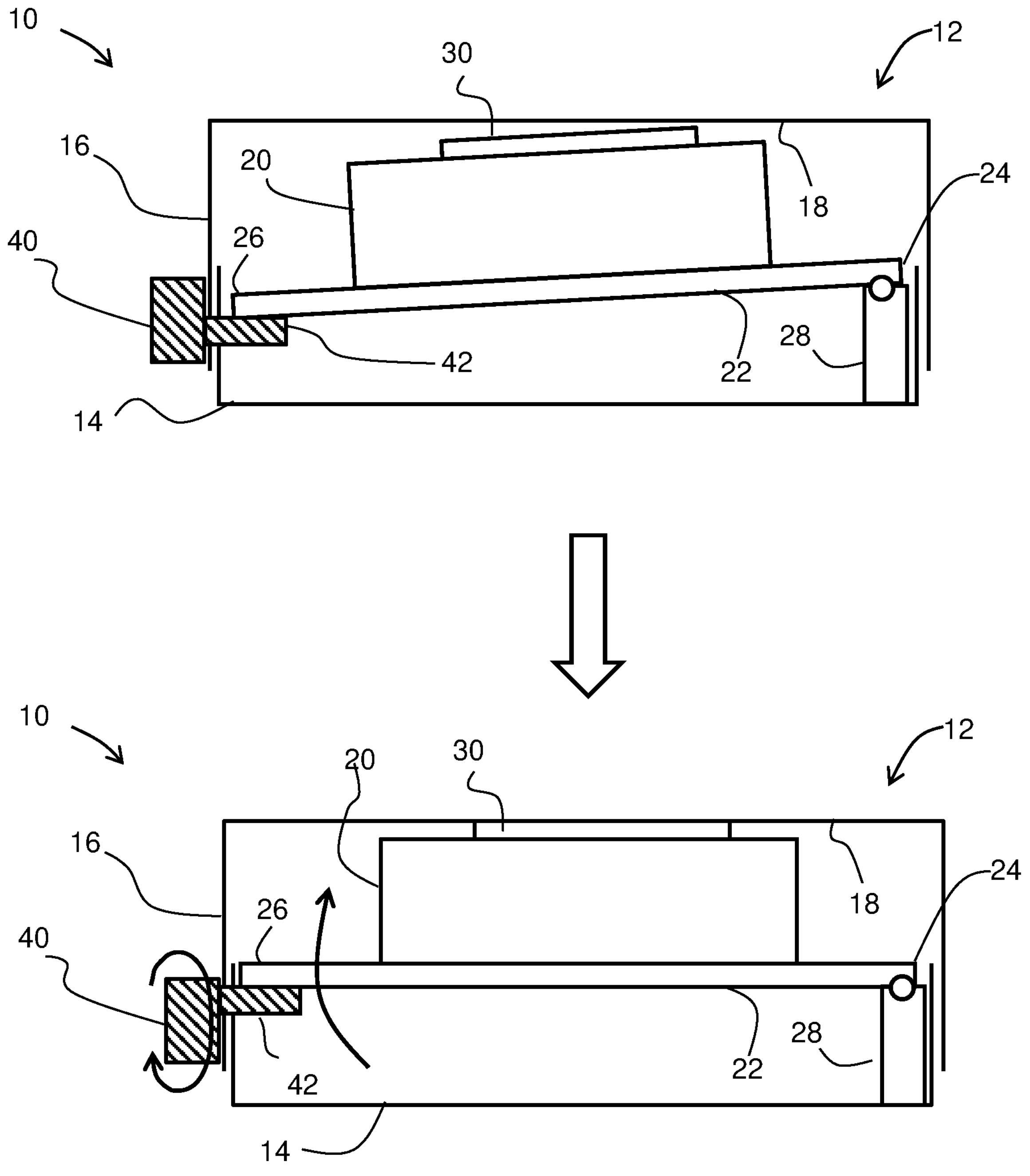
FIG. 1 shows in schematic form the concept of the invention as applied to a generic electronic assembly.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an electronic assembly comprising a housing having a base and a cover and electronic component mounted in the housing on a carrier. The carrier is pivotable about a first edge within the housing. An adjustment handle moves the carrier at a second, opposite, edge thereby to bring the electronic component into thermal contact with an internal surface of the cover after the cover is closed (e.g. during locking of the cover), for dissipating heat from the electronic component.

FIG. 1 shows in schematic form the concept of the invention as applied to a generic electronic assembly 10.

The electronic assembly 10 comprises a housing 12 having a base 14 and a cover 16, the cover 16 being openable and closeable and having an internal surface 18.

An electronic component 20 is positioned in the housing and is inserted when the cover is opened. The component 20 is mounted on a carrier 22 such as a steel plate. The carrier comprises a first edge 24 and an opposite second edge 26. The first edge 24 is pivotably mounted relative to the base 14 of the housing. For example, the first edge 24 sits on a support 28 and it can rotate about that support.

A thermal coupling component 30, such as a thermal pad, is attached on top of the component 20 for example by a thermal paste. The thermal pad 30 is for making contact with the internal surface 18 of the cover for dissipating heat from the electronic component 20.

In the top image of FIG. 1, the cover 16 is closed over the base 14, but the thermal pad 30 does not yet contact the inner surface. It may already contact the inner surface, for example near the first edge 24, but the full compression force to be applied to the thermal pad has not yet been provided. The thermal pad may even make full contact with the internal surface 18 as soon as the cover is closed, but again the full desired compression force has not yet been applied to the thermal pad.

The invention is based on the use of an adjustment handle 40 on the outside of the housing for increasing the thermal coupling between the thermal pad and the internal surface after closing the cover, for example as part of the procedure for locking the cover in its closed position.

An actuator 42 is moved by the adjustment handle 40, and the actuator engages with the carrier 22, thereby to adjust a position of the second edge 26 of the carrier so as to move the thermal coupling component 30 towards the internal surface 18 of the cover.

The adjusted position of the carrier is shown in the bottom image.

The adjustment handle is for example movable between a first position (the top image of FIG. 1) in which the cover can be opened and closed, and a second position (the bottom image in FIG. 1) in which the cover is locked to the base.

Thus, the same handle is used to lock the cover closed as well as moving the carrier to implement a good thermal coupling between the cover and the electronic component.

The bottom image of FIG. 1 shows that the second position of the adjustment handle makes the carrier 22 parallel to the base 14 and at its highest position. The thermal pad 30 is compressed and is tightly pressed against the cover to provide desired thermal coupling between the component and the cover, so that heat can be dissipated to the ambient surroundings around the cover.

The cover can be closed easily, since closing the cover does not require tight engagement between the cover 16 and the thermal pad 30. In particular, the cover is subjected to very little force during closing. When the cover is closed, a gasket is for example clamped between the cover 16 and the base 14 to create a sealed enclosure for the component 20. The locking of the cover closed using the adjustment handle provides a small pressure between the base and the cover, to compress the gasket for water-proofing purposes.

The operation of the adjustment handle also improves the thermal coupling, by tilting the carrier about the first edge and towards the internal surface of the cover.

The adjustment handle 40 in the example shown comprises a rotary adjustment knob, and the rotation is translated to an upward movement of the carrier. This translation for example is achieved using a cam. The cam for example has a smaller radius than the radius of the knob (about a common rotation axis), so that a movement of the adjustment handle (i.e. the length of a rotation arc) is translated to a smaller linear of movement of the carrier caused by the cam.

The adjustment handle 40 thus provides a mechanical advantage so that the knob is easy to turn despite the large force that is desired between the thermal pad and the inside of the cover.

The concept of the invention may be applied to any electronic assembly. One example will now be presented in more detail, relating to an application of the invention to a luminaire.

Figure 2:
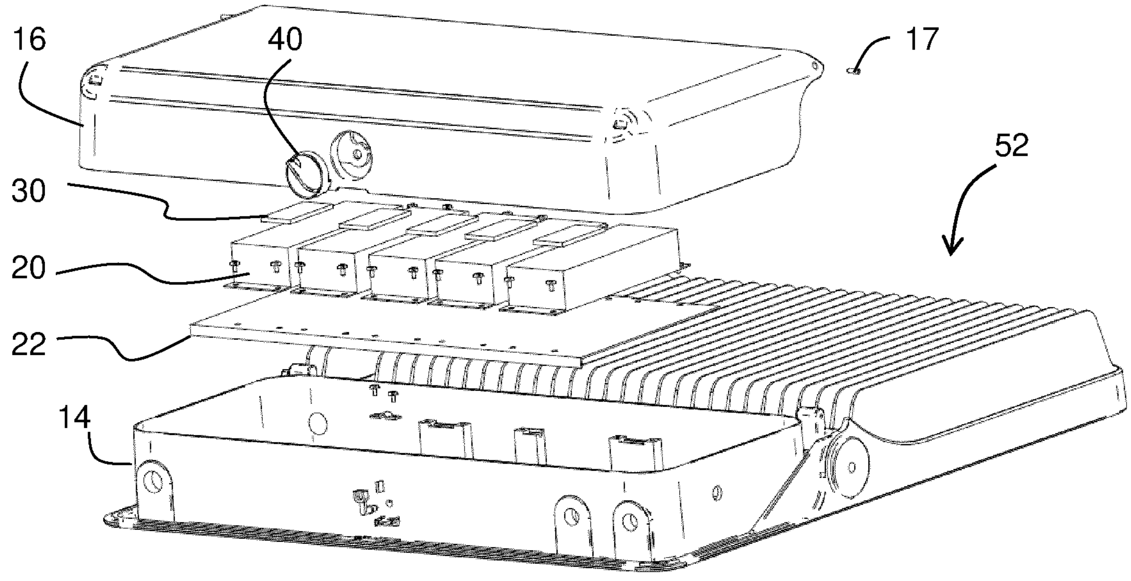
FIGS. 2 and 3 each show a luminaire incorporating the adjustment concept of FIG. 1, in exploded form from different viewpoints.
Figure 3:
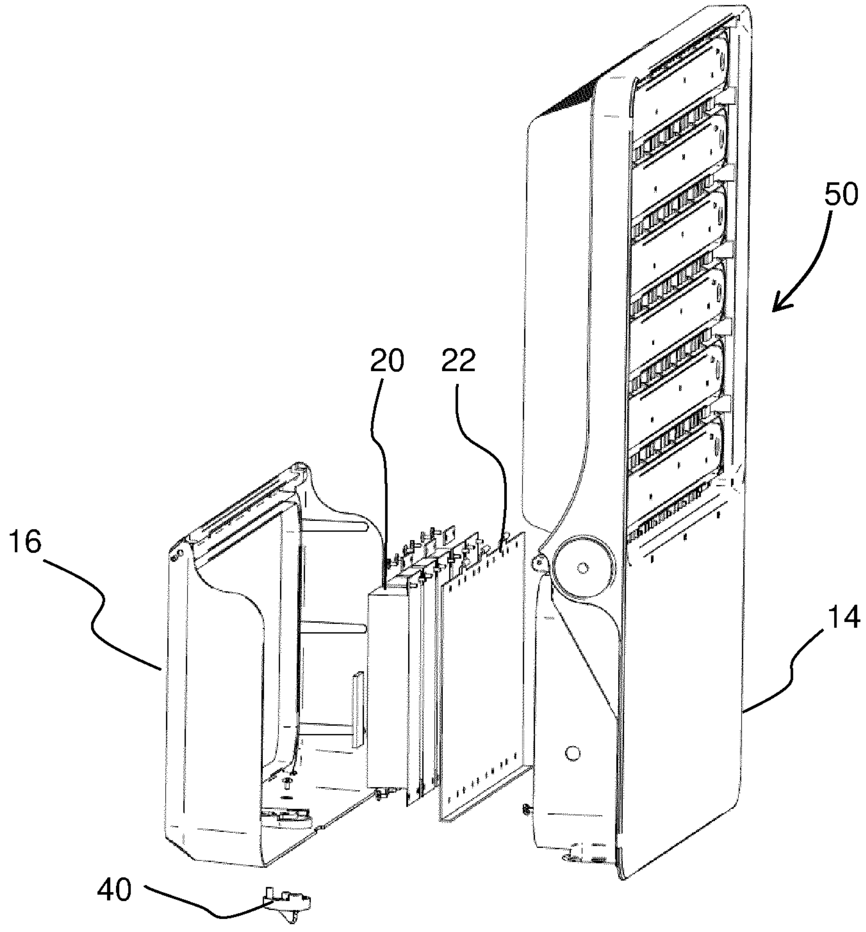

FIGS. 2 and 3 each show a luminaire incorporating the adjustment concept as explained above, in exploded form from different viewpoints.

The luminaire is for example a road lighting luminaire.

FIGS. 2 and 3 show the housing base 14 and cover 16, and a set of four lighting driver circuits 20 mounted on a carrier 22 in the form of a steel plate. Each driver circuit comprises a printed circuit board on which electronic components are mounted. Each driver circuit 20 has a thermal pad 30 for thermal coupling to the cover 16 as explained above. The carrier provides the required support strength to enable the thermal pad 30 to be pressed against the cover.

The base 14 of the housing also defines a support structure for the light source of the luminaire, namely an LED arrangement 50. A heat sink 52 in the form of a set of fins is provided over the LED arrangement 50. The cover 16 of the housing functions as a heat sink for the driver circuits 20.

The cover 16 pivots open around hinge pins 17 at the back of the top of the cover, above the first edge 24 of the carrier. This enables insertion of the driver circuits into a driver cavity formed by the housing.

Figure 4:
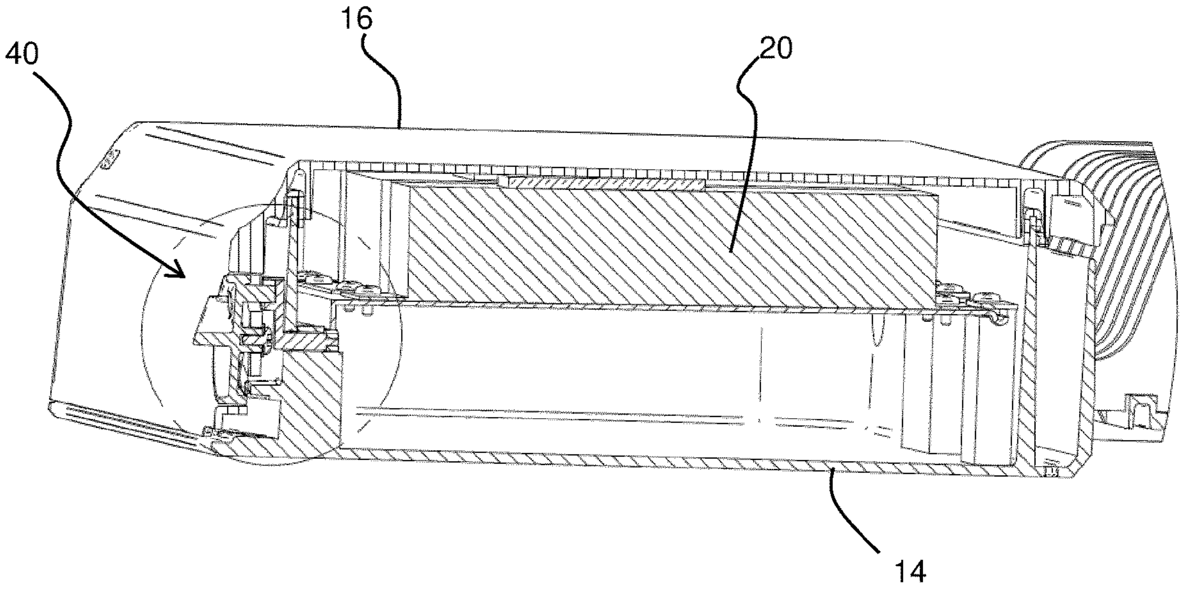
FIG. 4 shows a cross section through the driver housing part of the luminaire.
Figure 5:
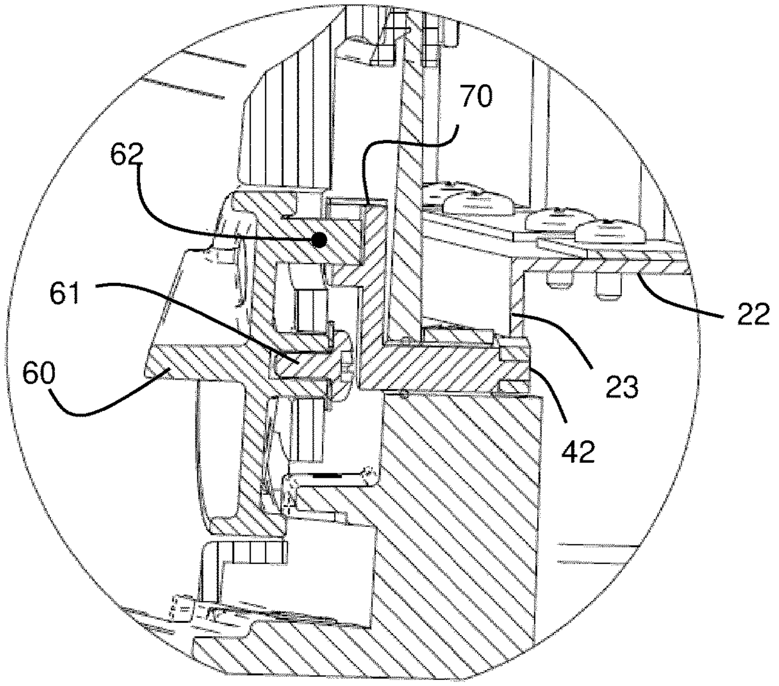
FIG. 5 shows an enlarged view of the adjustment handle of FIG. 4.

FIG. 4 shows a cross section through the driver cavity part of the luminaire housing and FIG. 5 shows an enlarged view of the adjustment handle. In FIGS. 4 and 5 the cover is closed but the thermal pad is not yet compressed.

The adjustment handle 40 comprises a first part 60 attached to the cover (by screw 61 about which it can rotate) and a second part 70 attached to the base. The first part 60 is an outer manually operated rotary handle part and the second part 70 is a crankshaft engaged by the rotary handle part when the cover 16 is closed. The handle part 60 has a pillar 62 which slots into a channel in the crankshaft 70 so that the handle part and the crankshaft are coupled together such that rotation of the handle part rotates the crankshaft about a common rotation axis.

Thus, when the rotary handle part 60 is in the position for closing or unlocking the cover, the angular position of the handle part is such that the pillar is received in the channel of the crankshaft when the cover is closed (or removed from the channel of the crankshaft when the cover is opened). Rotation of the rotary handle part rotates the engaged crankshaft, and rotation of the crankshaft rotates the actuator 42.

The actuator 42 is a cam which pushes up on the underside of the carrier 22, such as pushing up against a rib 23 which forms part of the carrier (for example a folded over edge of the carrier).

Rotation of the handle part not only lifts the carrier by means of the cam, but also locks the cover to the base.

Figure 6:
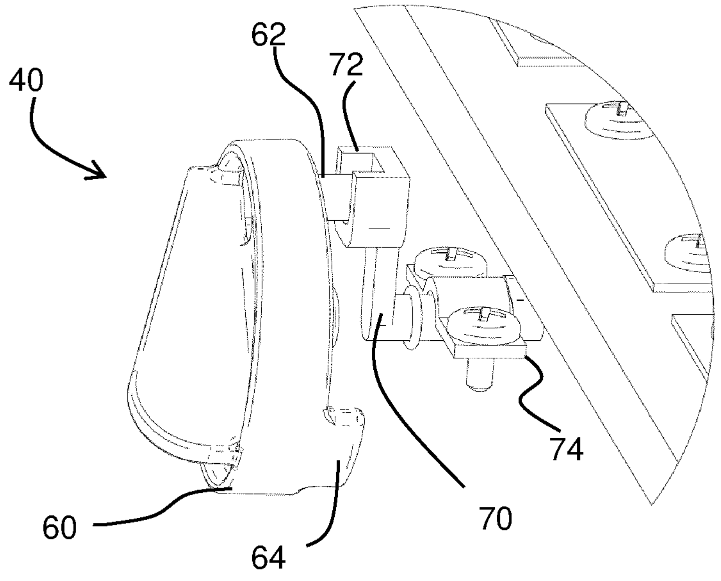
FIG. 6 shows the adjustment handle in more detail from above.
Figure 7:
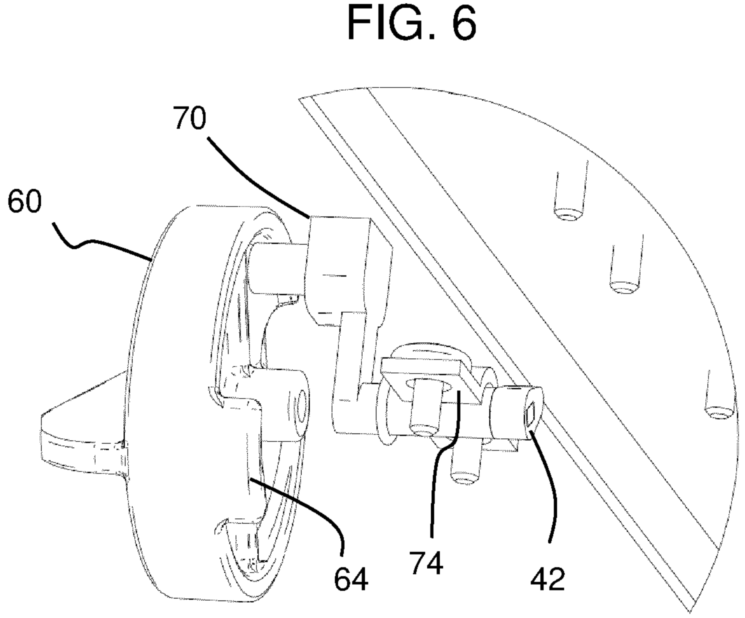
FIG. 7 shows the adjustment handle in more detail from below.

FIG. 6 shows the adjustment handle in more detail from above and FIG. 7 shows the adjustment handle in more detail from below. The crankshaft 70 is fixed with respect to the base by a pressing plate 74. The crankshaft can rotate within a channel formed by the pressing plate 74.

The handle part is shown in the unlocked orientation. The pillar 62 is at the top so that when the cover is closed, it slides vertically down into the channel 72 of the crankshaft 70. In this first position of the handle part, the cam 42 allows the carrier 22 to drop to its lowest position so that the second edge of the carrier 22 is in a position furthest from the internal surface of the cover.

Rotation of the adjustment handle to the second position pushes up the second edge of the carrier to a position closest to the internal surface of the cover.

Thus, when the cover is closed, the carrier is away from the cover so that little force is needed to close the cover. Only after the cover is closed is the carrier moved by operating the adjustment handle to create an enhanced thermal coupling and this also locks the cover.

The handle part 60 has a tab 64 which locks the cover to the base after the handle part 60 has been rotated. For example, the handle part is rotated clockwise so that the tab 64 is located at the bottom of the handle part, and it engages over a corresponding tab of the base to lock the cover closed over the base.

Figure 8:
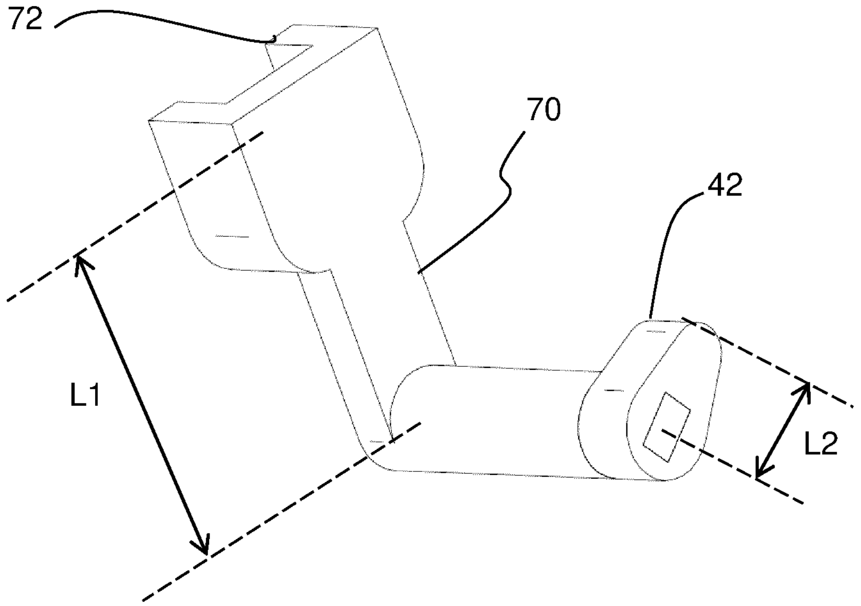
FIG. 8 shows the crankshaft in more detail.

FIG. 8 shows the crankshaft 70 in more detail. The crankshaft 70 has a length L1 (from the position of the pillar received in the channel 72 to the rotation axis) and the cam 42 has a length L2 (from the rotation axis to the tip of the cam).

The length L1 of the crankshaft rotation axis to the pillar is for example at least three times the length L2 of the actuator to the rotation axis. This gives a mechanical advantage that makes it easy to rotate the handle part and deliver a large force to compress the thermal coupling component.

The mechanical advantage is the ratio of the arc length in rotating the knob (over the range of angular adjustment of the knob) to the change in carrier position implemented by the cam. The carrier height adjustment by the cam is for example around 2 mm, and the arc length of the rotary knob movement may be around 1.5 cm (e.g. a 45 degree rotation with a radius of 2 cm) hence giving a mechanical advantage in this example of around 7.5. The mechanical advantage is for example in the range 5 to 20.

This makes it easy to apply a large compression force to the thermal pad. It also means it is easy to open the cover by rotating the handle part back to the first position in which the cover can be opened.

Figure 9:
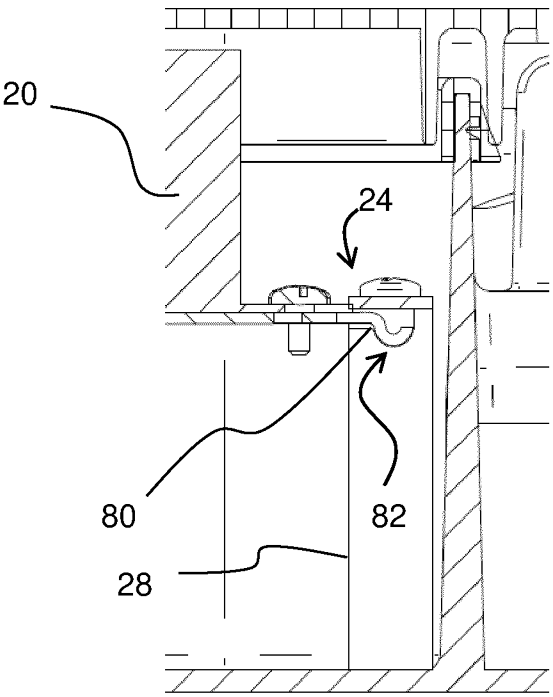
FIG. 9 shows the first edge of the carrier more clearly.

FIG. 9 shows the first edge 24 of the carrier 22 more clearly. The first edge of the carrier comprises an arcuate shaft 80 which can rotate with respect to a guide 82 formed by the support 28 extending up from the base of the housing. In this design, the carrier simply rests on the support 28. However, other pivotable connections may be formed between the first edge of the carrier and the base of the housing.

Figure 10:
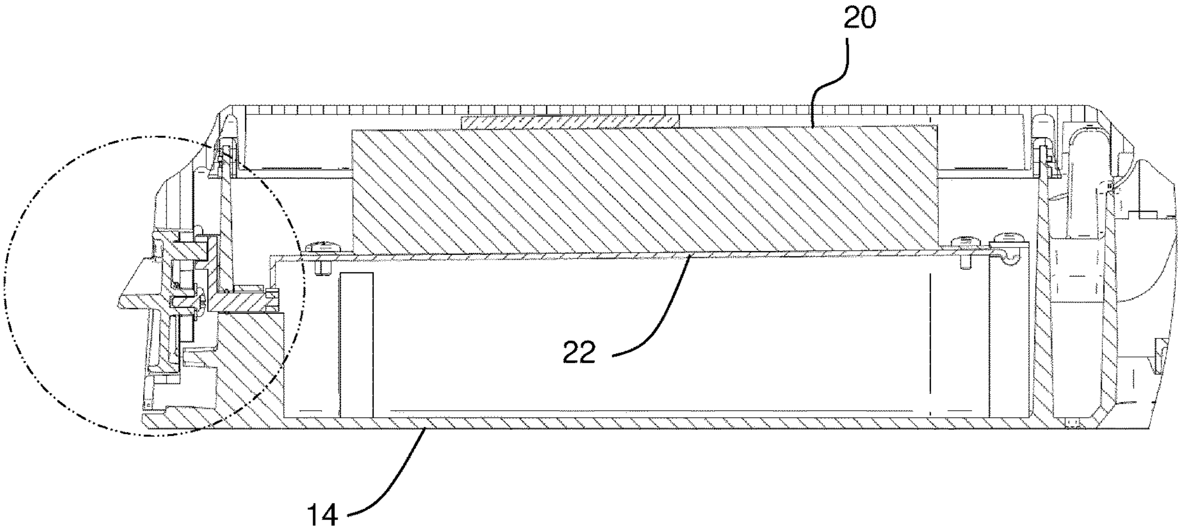
FIG. 10 shows the luminaire with the cover closed but the handle part not yet rotated.

FIG. 10 shows the driver cavity part of the luminaire with the cover closed but the handle part not yet rotated. The carrier 22 is at a small angle to the base (i.e. a small angle to the horizontal if the base is parallel to the horizontal).

Figure 11:
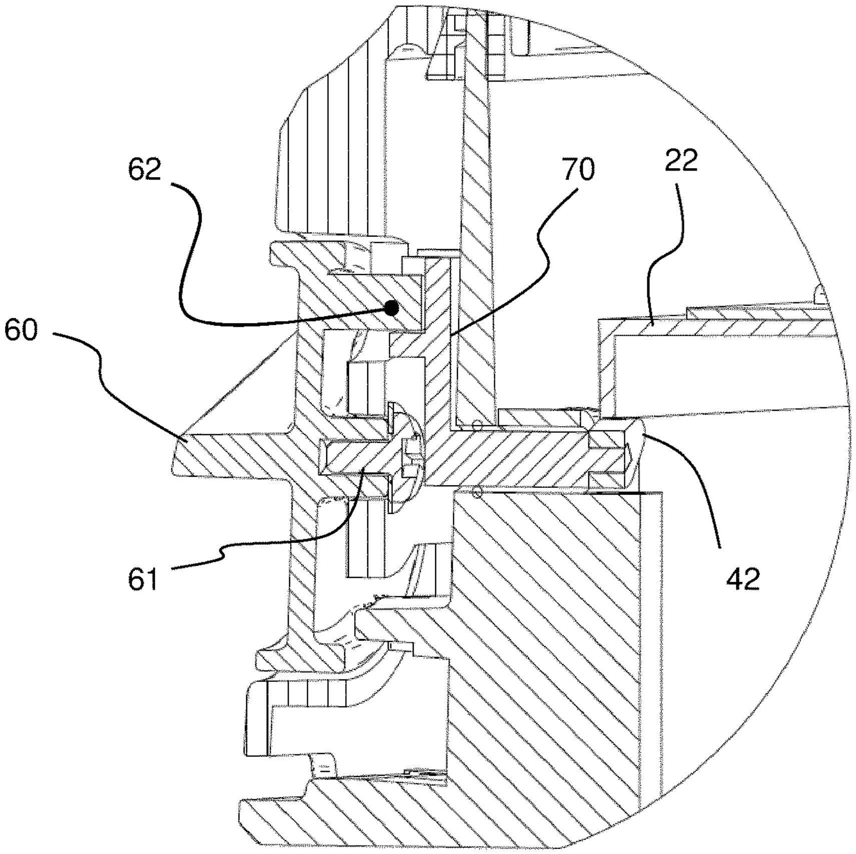
FIG. 11 shows an enlarged area of the adjustment handle of FIG. 10 with a cross section through the rotation axis.

FIG. 11 shows an enlarged area of the adjustment handle 40 with a cross section through the rotation axis. The cam 42 is positioned so that the carrier is at the lowest position at its second edge.

Figure 12:
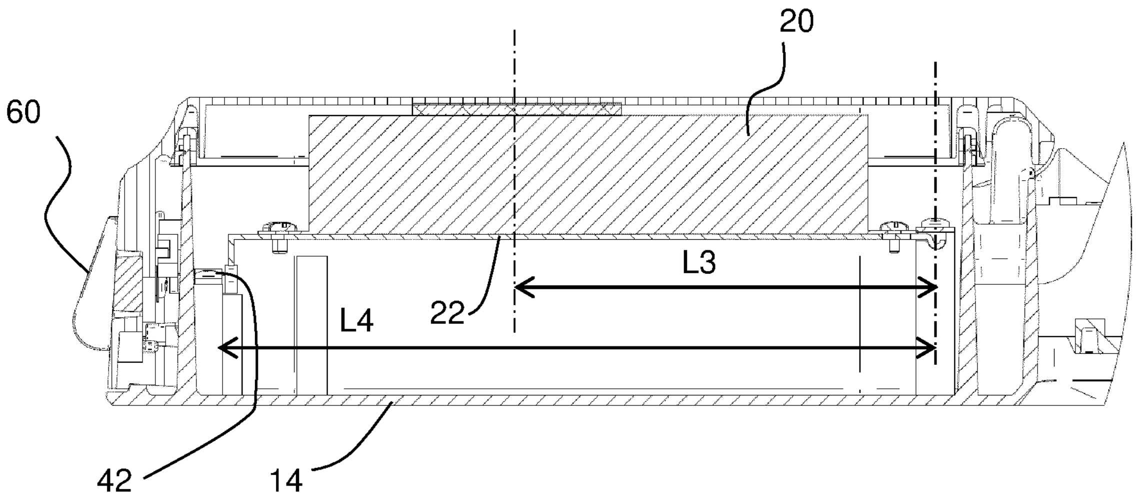
FIG. 12 shows the luminaire with the cover closed and the handle part rotated to the locked position.

FIG. 12 shows the driver cavity part of the luminaire with the cover closed and the handle part rotated to the locked position. The carrier 22 is now parallel to the base because the second edge of the carrier has been lifted up by the cam 42.

Figure 13:
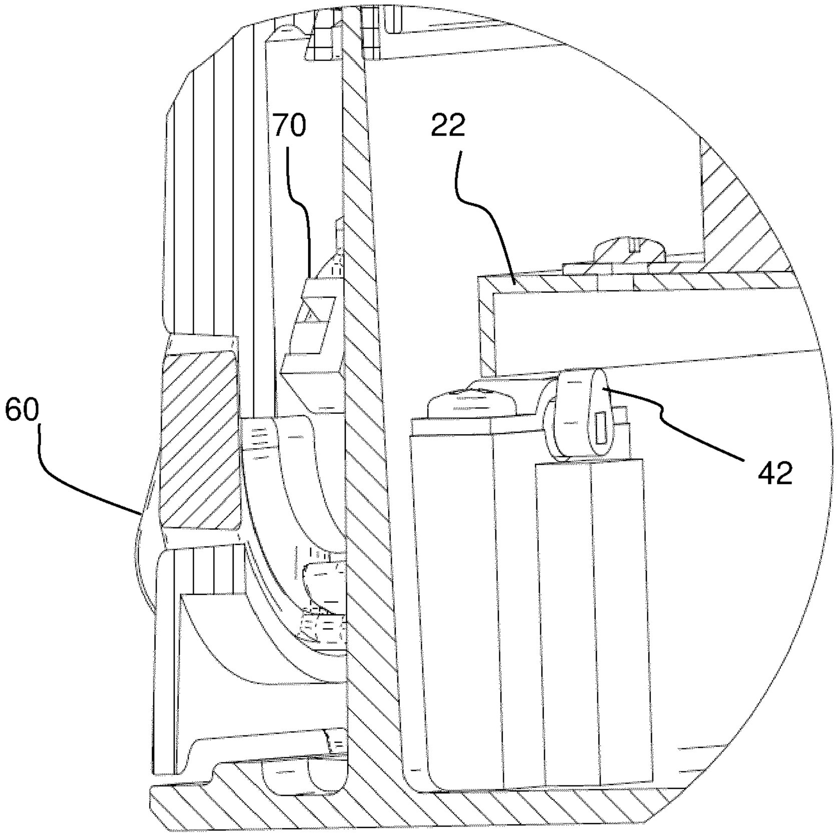
FIG. 13 shows an enlarged area of the adjustment handle of FIG. 12 with a cross section in front of the rotation axis.

FIG. 13 shows an enlarged area of the adjustment handle 40 with a cross section in front of the rotation axis so the cam can be seen in perspective view. The cam 42 is positioned so the carrier is at the highest position at its second edge because the cam 42 is standing upright to lift the carrier.

A center of the thermal pad 30 is for example at a first distance L3 from the first edge, and the length L4 of the carrier between the first and second edges of the carrier is at least 1.5 times the first distance.

This provides a further mechanical advantage in that a larger force and smaller movement is applied to the thermal pad, compared to the force and movement of the carrier at the second edge caused by the cam. A lifting by the cam of a first distance results in a smaller average lifting of the thermal pad, so that the overall mechanical advantage is increased to around 11 (7.5×1.5) in this particular example.

The example above is based on a rotary knob. However a slider or any other adjustment handle may be used to lift the free edge of the carrier, to lift it from an orientation which is tilted with respect to the desired thermal coupling orientation to a non-titled orientation.

The adjustment handle has two parts in the example above; one attached to the cover and one attached to the base. The adjustment handle may instead be only on the base, and it engages with the cover itself (rather than a portion of the handle attached to the cover) when the cover is closed.

The invention may be applied to any electronic assembly, and the luminaire shown in detail is by way of example only.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A lighting assembly, comprising:
- an LED arrangement;
- a heat sink thermally coupled to the LED arrangement for dissipating heat from the LED arrangement;
- a housing having a base and a cover, the cover being openable and closeable and having an internal surface;
- an electronic component mounted in the housing;
- a carrier on which the electronic component is mounted, the carrier comprising a first edge and an opposite second edge, wherein the first edge is pivotably mounted relative to the base of the housing;
- a thermal coupling component, separate from the heat sink, coupled the electronic component for making contact with the internal surface of the cover, wherein the cover is configured as a heat sink for dissipating heat from the electronic component;
- an adjustment handle on the outside of the housing; and
- an actuator being configured to be moved by the adjustment handle, wherein the actuator engages with the carrier, thereby to adjust a position of the second edge of the carrier thereby to move the thermal coupling component and electronic component towards the internal surface of the cover.

2. The assembly of claim 1, wherein a movement of the adjustment handle creates a smaller amount of movement of the actuator.

3. The assembly of claim 1, wherein the adjustment handle comprises a rotary adjustment knob and the actuator comprises a cam.

4. The assembly of claim 1, wherein the adjustment handle is movable between:

a first position in which the cover can be opened and closed, and a second position in which the cover is locked to the base.

5. The assembly of claim 4, wherein the adjustment handle comprises a first part attached to the cover and a second part attached to the base.

6. The assembly of claim 5, wherein:

in the first position of the adjustment handle, the first and second parts engage with each other by closing the cover, and the second edge of the carrier is in a position furthest from the internal surface of the cover; and in the second position of the adjustment handle, the second edge of the carrier is in a position closest to the internal surface of the cover.

7. The assembly of claim 5, wherein the first part comprises an outer manually operated rotary handle part attached to the cover and the second part comprises a crankshaft engaged by the rotary handle part when the cover is closed, wherein rotation of the rotary handle part rotates the engaged crankshaft and rotation of the crankshaft rotates the actuator.

8. The assembly of claim 7, wherein further including a handle part having a pillar which engages with a channel in the crankshaft when the cover is closed.

9. The assembly of claim 8, wherein the length from the crankshaft rotation axis to the pillar is at least three times the length from the actuator to the rotation axis.

10. The assembly of claim 1, wherein a center of the thermal coupling component is at a first distance from the first edge, and the length of the carrier between the first and second edges of the carrier is at least 1.5 times the first distance.

11. The assembly of claim 1, wherein the first edge of the carrier comprises an arcuate shaft which can rotate with respect to a guide formed by the base of the housing.

12. The assembly of claim 1 comprising a streetlight.

* * * * *